United States Patent Office 2,847,483
Patented Aug. 12, 1958

2,847,483

PRODUCTION OF VINYL HALIDES

Richard L. Meek, El Dorado, Ark., assignor, by mesne assignments, to Monsanto Chemical Company, St. Louis, Mo., a corporation of Delaware No Drawing. Application October 14, 1954
Serial No. 462,399

2 Claims. (Cl. 260—656)

The present invention is concerned broadly with the production of vinyl halides, and more particularly is concerned with the provision of a catalyst having a longer life and a higher activity for a longer period than catalysts now known in the production of vinyl halides.

The most commonly accepted commercial method for preparing vinyl halides, and in particular vinyl chloride, comprises the catalyzed vapor phase reaction of acetylene and hydrogen chloride. As a catalyst for this reaction, the halogen salts of mercury have been found to be superior to other materials. The theory behind the high efficiency of the mercury halides, and particularly mercuric chloride, resides in the apparent readiness of this salt to form complexes with the reactants as intermediates in the formation of the end product desired. Of the mercury catalysts, the more volatile mercuric chloride is most commonly used in this synthesis due to the low water solubility and relative inactivity of mercurous chloride, even though it has been found that the catalytic activity of the two forms is essentially equal. Due to the high vapor pressure of mercuric chloride, which is about 20 times that of mercurous chloride, attempts have been made to utilize the latter form by reducing the mercuric chloride in situ on a porous carrier to its mercurous state, and the prior art teaches the feasibility of this procedure. However, even the mercurous chloride catalyst shows a drop in activity after an extended period of use due to entrainment and sublimation losses.

Other catalyst mixtures, as exemplified by the prior art, have also been employed in this synthesis in an attempt to improve the product yield under conditions of sustained operations. For example, complex salts of mercuric chloride and potassium chloride, mercuric chloride and cerium chloride, and mercuric chloride and barium chloride, to mention a few, have been used.

None of these catalysts known to the prior art, however, have been entirely satisfactory under conditions of prolonged use. While mercurous chloride can be successfully utilized with a considerably lower loss of catalyst and a higher yield during the initial period of operation, it has been found that entrainment losses and a drop in efficiency of conversion begins to be noticeable between 100 and 200 hours of operation. After about 245 hours of operation with mercurous chloride catalyst it usually becomes necessary to raise the temperature of the catalyst to obtain commercially feasible yields. This increase in temperature causes a more rapid loss of catalyst and a more rapid drop in the rate of conversion, which would have already dropped below the initial 100% conversion rate prior to raising the temperature of the catalyst bed.

It is the primary object of the present invention to provide an improved catalyst for the synthesis of vinyl halides, and particularly vinyl chloride, having an activity of 100% for prolonged periods of use.

It is a further object to effect an improvement in the process for producing vinyl chloride through the medium of my improved catalyst.

A still further object is to provide a mixed catalyst on a suitable carrier which is superior to known catalysts.

A further object is to provide a relatively non-toxic catalyst for vinyl chloride synthesis.

Another object is to produce an improved catalyst readily utilizable in the vapor phase synthesis of vinyl chloride by the addition of hydrogen chloride to acetylene.

Other objects will become apparent from the description of the invention which follows.

According to the present invention, the surprising discovery has been made that a conventional catalyst comprising mercuric chloride on charcoal, modified by the presence of about 1%–10% of iron, renders a mixed catalyst highly superior to the catalysts of the prior art employed for this purpose. My improved catalyst makes possible a product yield of 100% for sustained periods of use. Furthermore, it is relatively non-toxic and inexpensive in comparison to compounds previously employed in mixed catalysts for the production of vinyl halides.

While activated charcoal is the preferred carrier for the practice of the present invention, activated alumina, silica gel, pumice, asbestos or other such activated material of high surface activity can be similarly employed.

The preferred technique for forming the catalyst of the present invention comprises first impregnating a carrier, such as activated charcoal, with an aqueous solution of a mercuric salt, such as mercuric chloride. After partial or total drying of the mass the mercuric chloride impregnated carrier is further impregnated with a ferrous salt, preferably ferrous chloride. If desired, however, both salts can be added simultaneously. Also free iron or its oxides can be utilized in lieu of the halogen salts thereof.

Whether free iron or a ferrous salt is employed with the mercuric salt, at least a partial oxidation-reduction reaction takes place either during or initially after the two materials are added to the carrier. During this oxidation-reduction reaction the iron is partially oxidized from the free or ferrous state to the ferric state and at least a portion of the mercury is reduced from the mercuric to the mercurous state.

While it is possible to reduce the mercury salt completely to the free state in situ, the presence of free mercury is undesirable in the preferred practice of the present invention, and a reduction reaction to this extent is to be avoided, and for this reason an excessive amount of iron in either the free or ferrous states should not be used. Where free iron or the oxide is employed, a charcoal containing the requisite iron content can be utilized, and it then becomes necessary only to impregnate the carrier with the mercuric salt in the manner to be subsequently described under conditions such as will permit an oxidation-reduction reaction to take place in situ.

The catalyst resulting from the above described procedure has been found to contain mercury in both its mercuric and mercurous states along with iron in both the ferrous and ferric states, depending upon the quantity of iron employed and the extent of the oxidation-reduction reaction. Also this catalyst may contain small amounts of both iron and mercury in their free states, however, as indicated, the presence of more than traces of free mercury is preferably to be avoided, although the presence of small amounts of free iron has been found not to be objectionable.

It can be hypothesized that the mechanism of the vinyl chloride synthesis, according to the present invention, resides in the formation of complex salts of the form $HgCl_2 \cdot HCl$ and $Hg_2Cl_2 \cdot HCl$, for example, $HHgCl_3$ or $H_2HgCl_4$. It is also logical to assume, due to the greater affinity of iron for inorganic acids, that ferrous and ferric chlorides form more active complexes than the mercury chlorides. These complexes probably have the form of $HFeCl_3$, $H_2FeCl_4$, $HFeCl_4$ or $H_2FeCl_5$, depending upon the state of the iron; and the greater activity of the iron complexes probably accounts, in some measure, for the improved results obtainable by using my catalyst.

The catalyst is formed by using a ferrous chloride-mercuric chloride mixture in the approximate molar proportions of 1 to 1, or a weight ratio of mercury to iron of approximately 4 to 1 in the preferred embodiment, with the total weight of the two salts comprising 10% to 20% of the catalyst weight, the remainder being activated charcoal or other such surface active material.

While the presence of iron in the catalyst mixture, either in the free or ferrous states, serves to substantially reduce the mercury from its highly volatile and toxic mercuric form to the mercurous form in situ on the carrier, the iron, as indicated, also acts as a promoter for the reaction, rendering a more active catalyst as well as extending the useful life of the conventional mercuric or mercurous chloride catalyst.

The terms "catalyst activity" and "catalyst life," as employed herein, pertain respectively to the efficiency of conversion of the reactants to the desired product, and how long the catalyst maintains an activity of at least 95%. When employing the catalyst of the present invention in the synthesis of vinyl chloride, 100% conversion of acetylene is obtained after 190 hours of operation. Based on the average rate of movement of the "hot spot" through the catalyst bed, the activity of my catalyst will remain at substantially the 100% conversion figure for at least 5600 hours of operation. A catalyst life of over 7000 hours is indicated when employing a standard 10 ft. commercial reactor without raising the temperature of the catalyst bed.

A minimum reaction temperature of 150° C. for carrying out the synthesis employing my mixed catalyst is indicated. As in the case of the conventional mercuric chloride-charcoal catalyst, the percentage conversion appeared to be independent of the temperature above the minimum, however, the reaction temperature should be kept below that at which the catalyst tends to excessively sublime.

While it has not been deasible in the examples which follow to run the tests until the catalyst is completely exhausted, the runs have been made, where appropriate, for a sufficient period of time to ascertain the rate of movement of the "hot spot" or reaction zone through the catalyst bed. Upon establishing this rate of movement, the activity and life of a given catalyst can be easily calculated. Several of the catalysts tested for comparative purposes showed an initially low percentage conversion and it was unnecessary to conduct the runs for extended periods for this reason.

When employing the catalyst of the present invention a very slow rate of movement of the "hot spot" is obtainable, so slow in fact that accurate determinations at a given point proved difficult. Therefore, the average rate of movement of the "hot spot" through the catalyst bed has been used in calculating the catalyst life and activity beyond the actual test period. As with catalysts of the prior art, once the "hot spot" has moved completely through the catalyst bed, the catalyst is not completely exhausted but does have a lowered activity. It can still be used to produce vinyl chloride in commercially feasible yields by raising the temperature to a level above that required for my fresh catalyst. As pointed out, one of the objects of the present invention is to provide a new catalyst and process whereby sustained yields of near 100% are possible for greatly extended periods without the necessity of resorting to such expedients as increased temperature.

In the specification and claims "iron" is intended to include free iron and the ferrous salts and oxides thereof and "mercury" is intended to include the halogen salts thereof unless otherwise specified.

The examples which follow are presented to illustrate in greater detail the mode of practicing the present invention, and are not intended to delimit the scope thereof.

*Example I*

A quantity of granular hardwood charcoal containing 6.5% iron in its free and ferrous states was oven-dried for five days at 110° C. After completion of drying, a 2,040 gram sample was weighed out and impregnated with 226.8 grams of mercuric chloride dissolved in ½ gallon distilled water by pouring the solution over the charcoal with thorough stirring. The impregnated charcoal was oven-dried at 110° C. until a constant weight was reached. Analysis of the dried catalyst showed a total iron content of 5.8% in the free state and both the ferrous and ferric states, and 7.4% of mercurous and mercuric mercury, with the mercurous form being present in the greater amount, indicating that a substantial reduction of the mercury took place.

A 30" single tube jacketed reactor provided with spaced thermocouples was charged with the preformed mixed catalyst prepared as above. Steam was introduced to the jacket until the temperature of the catalyst was raised above 100° C. The reactor was purged with nitrogen and HCl was then introduced at the bottom of the reactor at a flow rate of 1540 cc./min. As soon as the reactor was filled with HCl, acetylene was introduced at a flow rate of 1260 cc./min. The temperature of the catalyst at the point of first contact of the gas mixture was permitted to rise to 173° C., at which point a coolant was introduced to the jacket. The coolant comprised a mixture of steam and water having a temperature of 94° C. at the point of entrance and a discharge temperature of 106° C. The average rate of movement of the "hot spot" or point of reaction through the catalyst bed was 0.0172 inch per hour. Analysis of the gases leaving the reactor showed 100% conversion of the acetylene to vinyl chloride after 190 hours of operation, with the "hot spot" moving only 3.28 inches during this period.

Under the same conditions set forth in the two immediately preceding paragraphs, except that no iron was employed, a catalyst comprising 10% mercurous chloride on charcoal was tested. While the percentage of conversion during the 119 hours of the run was near 100%, the "hot spot" moved 20 inches, and would have moved completely through the catalyst bed in 245 hours of operation with an indicated drop in the percentage conversion occuring somewhere between 150 and 200 hours of operation.

*Example II*

To demonstrate the manner of preparing the catalyst employing charocal having no initial iron content, a quantity of granular iron-free hardwood charcoal was oven-dried for five days at 110° C. After completion of drying, 1360 grams of the dried charcoal was first impregnated with an aqueous solution of 150 grams of mercuric chloride by pouring the solution over the charcoal with vigorous stirring. The mass was dried and again impregnated with an aqueous solution of 70 grams of ferrous chloride by the same procedure. The mass was then oven-dried at 110° C. until a constant weight was obtained. Analysis of the dried catalyst showed the presence of 2.0% iron in both the ferrous and ferric states, and 7.0% mercury in both the mercuric and mercurous states.

A 30" single tube jacketed reactor, provided with spaced thermocouples, was charged with the preformed mixed catalyst prepared as above. Steam was introduced to the jacket until the temperature of the catalyst was raised above 100° C. The reactor was purged with nitrogen and HCl was then introduced at the bottom of the reactor at a flow rate of 1540 cc./min. As soon as the reactor was filled with HCl, acetylene was introduced at a flow rate of 1260 cc./min. The temperature of the catalyst at the point of first contact of the gas mixture was permitted to rise to 198° C., at which point a coolant, comprising a mixture of steam and water, was introduced to the jacket. The conversion of the acetylene to vinyl chloride was 100%. Movement of the "hot spot" during the short period of the run was so slight as to be undetectable.

*Example III*

A catalyst was prepared in the manner of Example II, except activated alumina was employed as the carrier. After drying, analysis showed the presence of 1.5% iron in both the ferrous and ferric states, and 5.4% mercury in both the mercurous and mercuric forms. A 30" single tube jacketed reactor was charged with 3360 grams of this catalyst and vinyl chloride produced as in the preceding examples. The temperature of the "hot spot" was 178° C. and the percentage conversion was 100%. The movement of the "hot spot" during the six hours of the run was so slight as to be undetectable as in Example II where charcoal was employed.

*Example IV*

To further illustrate the improved results obtainable according to the present invention, a run was conducted employing 1080 grams of a 90% charcoal-10% mercuric chloride catalyst. The run was conducted and the catalyst was prepared in the manner set forth in the preceding examples. The temperature of the "hot spot" was 179° C., and after only 10 hours of operation the percentage conversion had dropped to 98.9%.

*Example V*

To further illustrate the necessity for employing both iron and mercury in my catalyst, 970 grams of a catalyst comprising 95.1% charcoal and 4.9% ferrous chloride was employed in the manner of Example II. The "hot spot" temperature was 154° C., and the percentage conversion of the acetylene to vinyl chloride was only 40% after six hours' operation.

Although the details of carrying out the present invention have been set forth in connection with the production of vinyl chloride, it is to be understood that the other vinyl halides may likewise be prepared by substituting the appropriate halogen acid and preferably the corresponding metal salts in preparing the catalyst.

Modifications apparent to those skilled in the art are intended to be included within the spirit and scope of the invention except as defined in the claims which follow.

What is claimed is:

1. A process for the preparation of vinyl chloride which comprises passing a mixture of acetylene and hydrogen chloride in the vapor phase over a mixed preformed catalyst of mercurous and mercuric chloride and ferrous and ferric chloride supported upon and intimately commingled with activated charcoal, said catalyst being prepared by treating said charcoal with aqueous solutions of mercuric chloride and ferrous chloride under conditions such as to permit at least a partial oxidation-reduction reaction to take place in situ, said mercuric chloride and ferrous chloride being employed in an approximate molar ratio of 1:1.

2. A process for the preparation of vinyl chloride which comprises passing a mixture of acetylene and hydrogen chloride in the vapor phase over a mixed preformed catalyst of mercurous and mercuric chloride and ferrous and ferric chloride supported upon and intimately commingled with a material of high surface activity, said catalyst being prepared by treating said material of high surface activity with aqueous solutions of mercuric chloride and ferrous chloride under conditions such as to permit at least a partial oxidation-reduction reaction to take place in situ, said mercuric chloride and ferrous chloride being employed in an approximately molar ratio of 1:1.

References Cited in the file of this patent

UNITED STATES PATENTS

| | | |
|---|---|---|
| 2,338,459 | Schaeffer | Jan. 4, 1944 |
| 2,391,465 | Lazier et al. | Dec. 25, 1945 |

FOREIGN PATENTS

| | | |
|---|---|---|
| 596,186 | Great Britain | Dec. 30, 1947 |

OTHER REFERENCES

Wibaut et al.: Rec. Trav. Chim. des Pays-Bas, vol. 51, pages 636–640 (1932), "Addition of HCl to $C_2H_2$ . . ."

UNITED STATES PATENT OFFICE
CERTIFICATE OF CORRECTION

Patent No. 2,847,483                              August 12, 1958

Richard L. Meek

It is hereby certified that error appears in the printed specification of the above numbered patent requiring correction and that the said Letters Patent should read as corrected below.

Column 2, line 70, for "$HgCL_2 \cdot HCl$ and $Hg_2Cl_2 \cdot HCl$," read -- $HgCl_2 \cdot nHCl$ and $Hg_2Cl_2 \cdot nHCl$, --.

Signed and sealed this 23rd day of August 1960.

(SEAL)
Attest:

KARL H. AXLINE                                  ROBERT C. WATSON
Attesting Officer                             Commissioner of Patents